(12) United States Patent
Qi et al.

(10) Patent No.: US 11,886,199 B2
(45) Date of Patent: Jan. 30, 2024

(54) MULTI-SCALE DRIVING ENVIRONMENT PREDICTION WITH HIERARCHICAL SPATIAL TEMPORAL ATTENTION

(71) Applicant: Toyota Motor Engineering & Manufacturing North America, Inc., Plano, TX (US)

(72) Inventors: Xuewei Qi, Mountain View, CA (US); Kentaro Oguchi, Mountain View, CA (US); Yongkang Liu, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 287 days.

(21) Appl. No.: 17/500,447

(22) Filed: Oct. 13, 2021

(65) Prior Publication Data

US 2023/0116442 A1 Apr. 13, 2023

(51) Int. Cl.
*G05D 1/02* (2020.01)
*G06F 18/25* (2023.01)
(Continued)

(52) U.S. Cl.
CPC ......... *G05D 1/0251* (2013.01); *G05D 1/0214* (2013.01); *G05D 1/0219* (2013.01); *G05D 1/0223* (2013.01); *G05D 1/0276* (2013.01); *G06F 18/21355* (2023.01); *G06F 18/253* (2023.01)

(58) Field of Classification Search
CPC .. G05D 1/0251; G05D 1/0214; G05D 1/0219; G05D 1/0223; G05D 1/0276; G06F 18/21355; G06F 18/253; G08G 1/0133; G08G 1/0141; G08G 1/096725; G08G 1/096758; G08G 1/096775; G08G 1/096783; G08G 1/096791; G08G 1/163; G08G 1/166; G08G 1/0112; G08G 1/0116; G08G 1/04; G08G 1/096827; G08G 1/096844; G08G 1/167; H04W 4/44; H04W 4/46; G06V 10/806; G06V 10/82; G06V 20/56
See application file for complete search history.

(56) References Cited

U.S. PATENT DOCUMENTS 6,879,969 B2   4/2005   Engstroem et al.
8,903,588 B2   12/2014  Schmudderich et al.
(Continued)

FOREIGN PATENT DOCUMENTS

CN   110059582 A    7/2019
WO   2019203297 A1  10/2019

*Primary Examiner* — Rodney A Butler
(74) *Attorney, Agent, or Firm* — Dinsmore & Shohl LLP (57) ABSTRACT

In accordance with one embodiment of the present disclosure, method includes obtaining multi-level environment data corresponding to a plurality of driving environment levels, encoding the multi-level environment data at each level, extracting features from the multi-level environment data at each encoded level, fusing the extracted features from each encoded level with a spatial-temporal attention framework to generate a fused information embedding, and decoding the fused information embedding to predict driving environment information at one or more driving environment levels.

20 Claims, 8 Drawing Sheets

(51) Int. Cl.
*G06F 18/21* (2023.01)
*G06F 18/2135* (2023.01)

(56) References Cited

U.S. PATENT DOCUMENTS

| | | |
|---|---|---|
| 9,165,477 B2 | 10/2015 | Wilson |
| 9,360,328 B2 | 6/2016 | You et al. |
| 10,496,098 B2 | 12/2019 | Zhu et al. |
| 10,611,379 B2 | 4/2020 | Olabiyi et al. |
| 10,759,446 B2 | 9/2020 | Motomura et al. |
| 11,073,831 B2 | 7/2021 | Jiang et al. |
| 2014/0195138 A1* | 7/2014 | Stelzig ............... G08G 1/0116 701/119 |
| 2015/0175162 A1* | 6/2015 | Nakadori ............ B60W 30/16 701/96 |
| 2019/0378412 A1 | 12/2019 | Zhu |

\* cited by examiner

MULTI-SCALE DRIVING ENVIRONMENT PREDICTION WITH HIERARCHICAL SPATIAL TEMPORAL ATTENTION

TECHNICAL FIELD

The present disclosure relates to deep learning, and more particularly to a deep-learning-based framework for fusing driving environment information from different sources at different scales with a spatiotemporal attention mechanism.

BACKGROUND

Understanding and predicting driving environment change is a core component for autonomous driving and advanced driving assistance systems (ADAS). An ego vehicle may have a variety of systems for gathering data and generating predictions at a variety of levels of perspective in its path. At the lowest level may be vehicles and objects nearby the ego vehicle's (e.g., <20 meters). At a medium level may be vehicles and objects further down the road from the ego vehicle (e.g., <200 meters). At a high level may be vehicles and objects later in the ego vehicle's route (e.g., >200 meters). At each level, a variety of data may be collected by the ego vehicle to make decisions. However, each level may rely on different systems to gather the data, which results in separate sets of data for each level. This prevents the ego vehicle from analyzing each set of data holistically and requires implementing different tasks separately, which usually results in information loss and high computational costs.

Therefore, intelligent strategies for multi-scale driving environment prediction that can analyze data holistically and simultaneously are desired.

SUMMARY

In accordance with one embodiment of the present disclosure, a method includes obtaining multi-level environment data corresponding to a plurality of driving environment levels, encoding the multi-level environment data at each level, extracting features from the multi-level environment data at each encoded level, fusing the extracted features from each encoded level with a spatial-temporal attention framework to generate a fused information embedding, and decoding the fused information embedding to predict driving environment information at one or more driving environment levels.

In accordance with another embodiment of the present disclosure, a system includes a controller. The controller is programmed to perform operations including obtaining multi-level environment data corresponding to a plurality of driving environment levels, encoding the multi-level environment data at each level, extracting features from the multi-level environment data at each encoded level, fusing the extracted features from each encoded level with a spatial-temporal attention framework to generate a fused information embedding, and decoding the fused information embedding to predict driving environment information at one or more driving environment levels.

In accordance with yet another embodiment of the present disclosure, a non-transitory medium has machine-readable instructions that cause a processor to perform operations including obtaining multi-level environment data corresponding to a plurality of driving environment levels, encoding the multi-level environment data at each level, extracting features from the multi-level environment data at each encoded level, fusing the extracted features from each encoded level with a spatial-temporal attention framework to generate a fused information embedding, and decoding the fused information embedding to predict driving environment information at one or more driving environment levels.

Although the concepts of the present disclosure are described herein with primary reference to cars and roadways, it is contemplated that the concepts will enjoy applicability to any vehicle and corresponding passageway. For example, and not by way of limitation, it is contemplated that the concepts of the present disclosure will enjoy applicability to boats and rivers.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The framework of the embodiments is a transformer-based multi-scale Hierarchical Spatial Temporal Attention (HSTA) model. The HSTA model fuses the driving environment information from different levels and at different scales. Traditional predictive machine learning models rely on gated recurrent neural networks (RNNs), such as Long Short-Term Memory (LSTM) and Gated Recurrent Units (GRUs), to perform deep learning, such as classifying, processing, and/or making predictions based on time series data. RNNs could have additional attention mechanisms to mimic cognitive attention by focusing on important parts of the input data and deemphasizing the rest. The HSTA model, due to its transformer-based nature, also incorporate attention mechanisms but without the RNN structure. Instead, the HSTA model has an encoder-decoder structure.

The encoding block and the attention and fusion block, including the HSTA model, encodes together the data from each level into a single data structure that can be used by a decoder to generate predictions. The encoder, with the help of the attention models, generates encodings that contain information about parts of the inputs that are relevant to each other. Each encoder layer passes its encodings to the next encoder layer as inputs. The decoder takes the combined encoding and uses convolutional neural networks (CNNs) trained to for a particular task (e.g., making road-level predictions).

Figure 1:
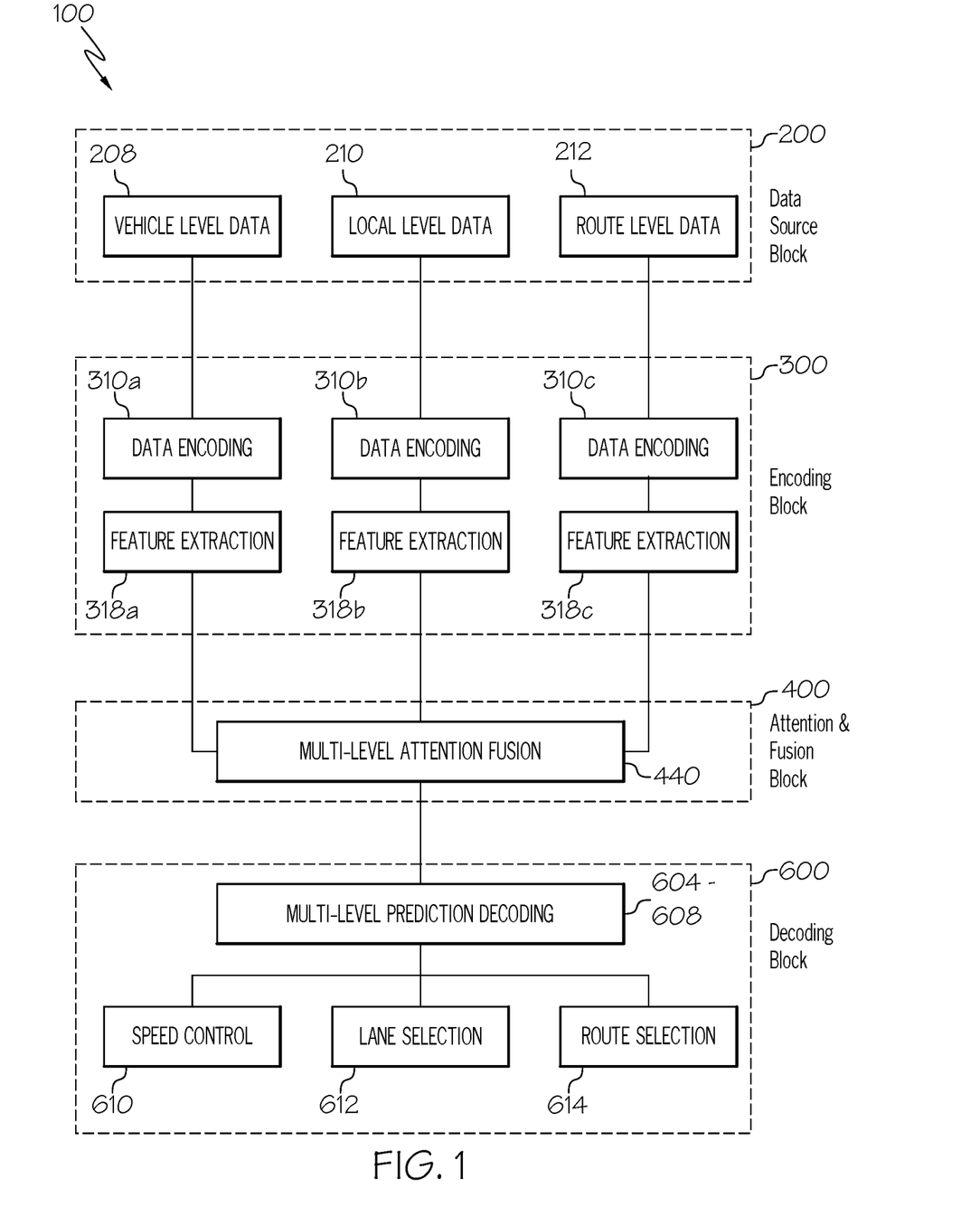
FIG. 1 depicts an example multi-scale driving environment prediction system, according to one or more embodiments shown and described herein.

The embodiments disclosed herein include methods and systems for multi-scale driving environment prediction. Embodiments of the present disclosure are directed to a deep-learning-based holistic framework for fusing driving environment information from different sources at different scales. Fusing may be performed with a spatiotemporal attention mechanism so that the right information from different scales can be collectively understood and extracted for predicting the driving environment at different levels (e.g., trajectory level, lane level, road level, and route level) simultaneously. Embodiments include four blocks: a data source block (FIG. 2), an encoding block (FIG. 3), an attention and fusion block (FIGS. 4 and 5), and a decoding block (FIG. 6). FIG. 1 shows the four blocks of the multi-scale driving environment prediction system.

Referring now to FIG. 1, an example multi-scale driving environment prediction system 100 is depicted. The system 100 is a deep-learning-based holistic prediction framework for predicting the driving environment at different scales coherently without implementing different tasks separately. The advantage of the system 100 is that it is more efficient than traditional methods and results in less information loss. The system 100 is comprised of four blocks: a data source block 200, an encoding block 300, an attention and fusion block 400 and a decoding block 600. The encoding block 300, attention and fusion block 400, and decoding block 600 may reside in a single computing device (e.g., a connected vehicle). The data sources of the data source block 200 may originate from a variety of sources, including the connected vehicle, and represent a variety of levels (e.g., vehicle level, local level, and route level). At the encoding block 300, the data from the data source block 200 are received as input to be encoded in a format corresponding to their level. After encoding, the data goes through a feature extraction process. At the attention and fusion block 400, the extracted features are fused into a single embedding. The attention and fusion block 400 utilizes a transformer-based, multi-scale HSTA model for fusing the driving environment information from different levels and at different scales. At the decoding block 600, a decoder may decode the embedding from the attention and fusion block 400 to generate predictions and/or recommendations at each corresponding data level. Because the data is fused such that each data level can take advantage of adjacent data levels, the generated predictions and/or recommendations are more robust than if they had been independently generated at each level.

Figure 2:
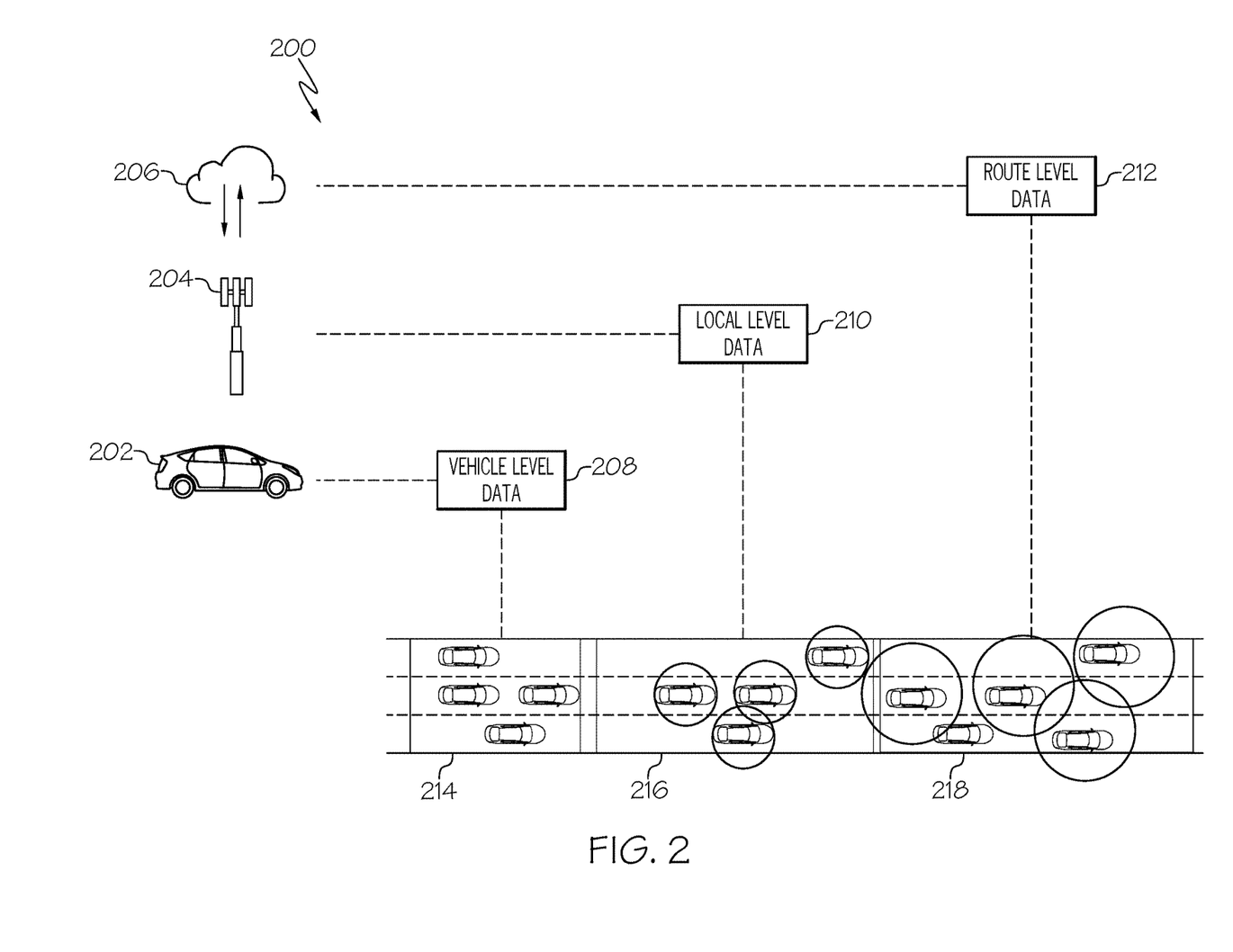
FIG. 2 depicts an example data source block, according to one or more embodiments shown and described herein.

Referring now to FIG. 2, an example data source block 200 is depicted. The data source block 200 comprises a variety of data sources that together make up the inputs for the system 100. It should be understood that embodiments may include a number of levels greater than or less than that depicted in FIG. 2. The data sources of the data source block 200 are arranged in a hierarchy. At the bottom level of the hierarchy are vehicle sensors 202 of an ego vehicle. Vehicle sensors 202 may include LIDAR sensors, RADAR sensors, imaging sensors, and/or the like. The vehicle sensors 202 collect vehicle level data 208 from the immediate surroundings of the ego vehicle. For example, the vehicle level data 208 may be information that can be collected by the vehicle sensors 202 in a road segment 214 within a 20-meter range of the ego vehicle. It should be understood that embodiments are not limited to a 20-meter range. Because the information collected for the vehicle level data 208 is from the road segment 214 in the immediate environment of the ego vehicle, the latency is negligible and the ego vehicle can rely on it for immediate and/or critical tasks. For example, the ego vehicle can rely on the vehicle level data 208 for determining an optimal longitudinal speed, reacting to nearby vehicles, and any other interactions with objects in the vicinity of the ego vehicle. In some embodiments, the vehicle level data 208 may include data from nearby vehicles in addition to data from vehicle sensors 202. For example, the ego vehicle may communicate with nearby vehicles, infrastructure, and/or any other nearby sensing device via V2X communication. This may further assist the ego vehicle with interacting with its nearby environment, such as enabling cooperative adaptive cruise control (ACC) and similar cooperative systems.

At the middle level of the hierarchy is local sensors 204 from local vehicles and/or infrastructure. Local sensors 204 may include LIDAR sensors, RADAR sensors, imaging sensors, and/or the like. Local sensors 204 may be positioned such that they are capable of sensing road conditions at a much wider range and under various weather conditions (e.g., rain, fog, snow). As such, local sensors 204 may collect local level data 210 from the local environment. For example, the local level data 210 may be information that can be collected by vehicle and/or infrastructure sensors in a road segment 216 within a 200-meter range of the ego vehicle. It should be understood that embodiments are not limited to a 200-meter range. Because the information collected for the local level data 210 is from a further distance than the vehicle level data 208, the latency may be higher than the latency for the vehicle level data 208, as shown by the rings around the vehicles in the road segment 216. The increased latency may decrease the accuracy and/or the frequency of the local level data 210. The host of the local sensors 204 (e.g., infrastructure or vehicle) may communicate its sensed information nearby vehicles, infrastructure, and/or any other local sensing device via wireless communication, such as V2X, DSRC, mmWave, cellular, and/or the like. For example, the ego vehicle may communicate with a roadside unit (RSU) 150 meters down the road to receive information about lane congestion.

At the high level of the hierarchy is a cloud source 206. The cloud source 206 may include route level data 212 from crowdsourced and/or aggregated data sources, such as vehicle and/or infrastructure sources. The route level data 212 may include information regarding the status of roadways, such as traffic information, construction information, road closures, and the like. Because the route level data 212 may derive from a collection of sources, the route level data 212 may include data from vehicles and/or infrastructure greater than 200 meters from the ego vehicle, such as at a road segment 218. It should be understood that embodiments are not limited to sources greater than 200 meters from the ego vehicle. Because the information collected for the route level data 212 is from further distances than the vehicle level data 208 or the local level data 210, the latency may be higher than the latency from the vehicle level data 208 and the local level data 210, which may further decrease the accuracy and/or the frequency of the route level data 212. To gather the route level data 212, the cloud source 206 may communicate with vehicles, infrastructure, and/or any other local sensing device via wireless communication, such as V2X, DSRC, mmWave, cellular, and/or the like, over a widespread area, such as a city. Because the route level data 212 represents more abstract data about the driving environment in a region, the route level data 212 may be used for optimal route selection.

Figure 3:
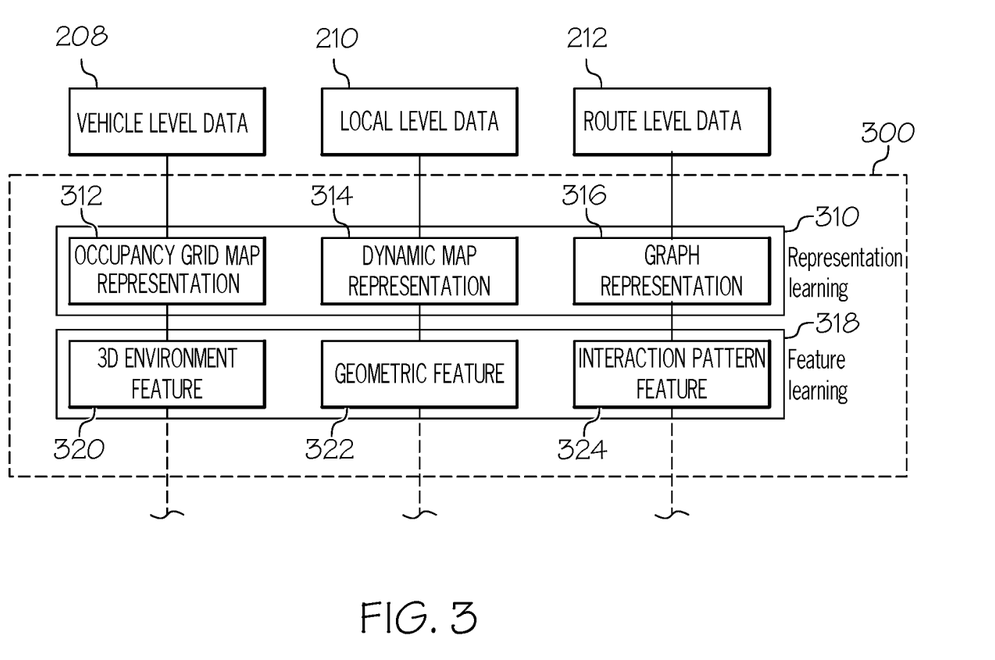
FIG. 3 depicts an example encoding block, according to one or more embodiments shown and described herein.

Referring now to FIG. 3, an example encoding block 300 is depicted. The purpose of the encoding block 300 is to encode spatial-temporal information within the same level. The levels are based on the data source hierarchy of data source block 200. The encoding block 300 may comprise two steps: representation learning 310 and feature learning 318. With representation learning 310, the input data may be encoded into a particular representation. For example, low-level input data may be encoded into a different representation than high-level input data. The representation chosen for a set of input data may make it easier to process for feature extraction (i.e., feature learning 318). With feature learning 318, the encoded representations of the input data may each be reduced to a set of features. The features are such that they contain the most relevant information from the encoded representations of the input data. Reducing the data to features improves the efficiency of processing by reducing the amount of data needed to be processed and focusing on the more essential pieces of data while still being able to accurately describe the actual data set.

Each level of information is encoded into different representations. At the bottom of the data hierarchy, vehicle level data 208 may be encoded as an occupancy grid map (OGM) 312. The OGM 312 shows drivable areas and non-drivable areas of the immediate surrounding area of the ego vehicle. The immediate surrounding area of the ego vehicle may cover a radius of fewer than 20 meters. For example, a sequence of depth images from the onboard imaging and LIDAR sensors of the ego vehicle may be encoded as an OGM 312. The OGM 312 representation may be fed as input to a CNN-based feature learning model to extract the basic features of the immediate environment of the ego vehicle. For example, the CNN-based feature learning model may extract 3D environment features 320 from the OGM 312, such as vehicles, pedestrians, lane markings, and other environmental features.

At the middle of the data hierarchy, local level data 210 may be encoded as a dynamic map representation 314. The dynamic map representation 314 may include the dynamic locations of detected vehicles and may be shown on a high definition map. The local level data 210 may cover a radius of fewer than 200 meters from the ego vehicle and be collected by sensors from infrastructure and/or vehicles within the coverage area. For example, local level data 210 may be collected from sensors installed on RSUs. The dynamic map representation 314 may be fed as input to a CNN-based feature extractor for learning geometric features 322 including the road geometry information as well as the location information of each detected object on the road.

At the top of the data hierarchy, route level data 212 may be encoded as a graph representation 316. The graph representation 316 can represent the traffic information at the lane level as well as the road network level. The route level data 212 may cover a radius of greater than 200 meters from the ego vehicle and be collected by sensors from infrastructure and/or vehicles within the coverage area. For example, the route level data 212 may include traffic data aggregated from roadside traffic sensors. The route level data 212 may be fed as input to a graph neural network (GNN) to learn and extract the interaction pattern features 324, such as vehicle interaction information.

Figure 4:
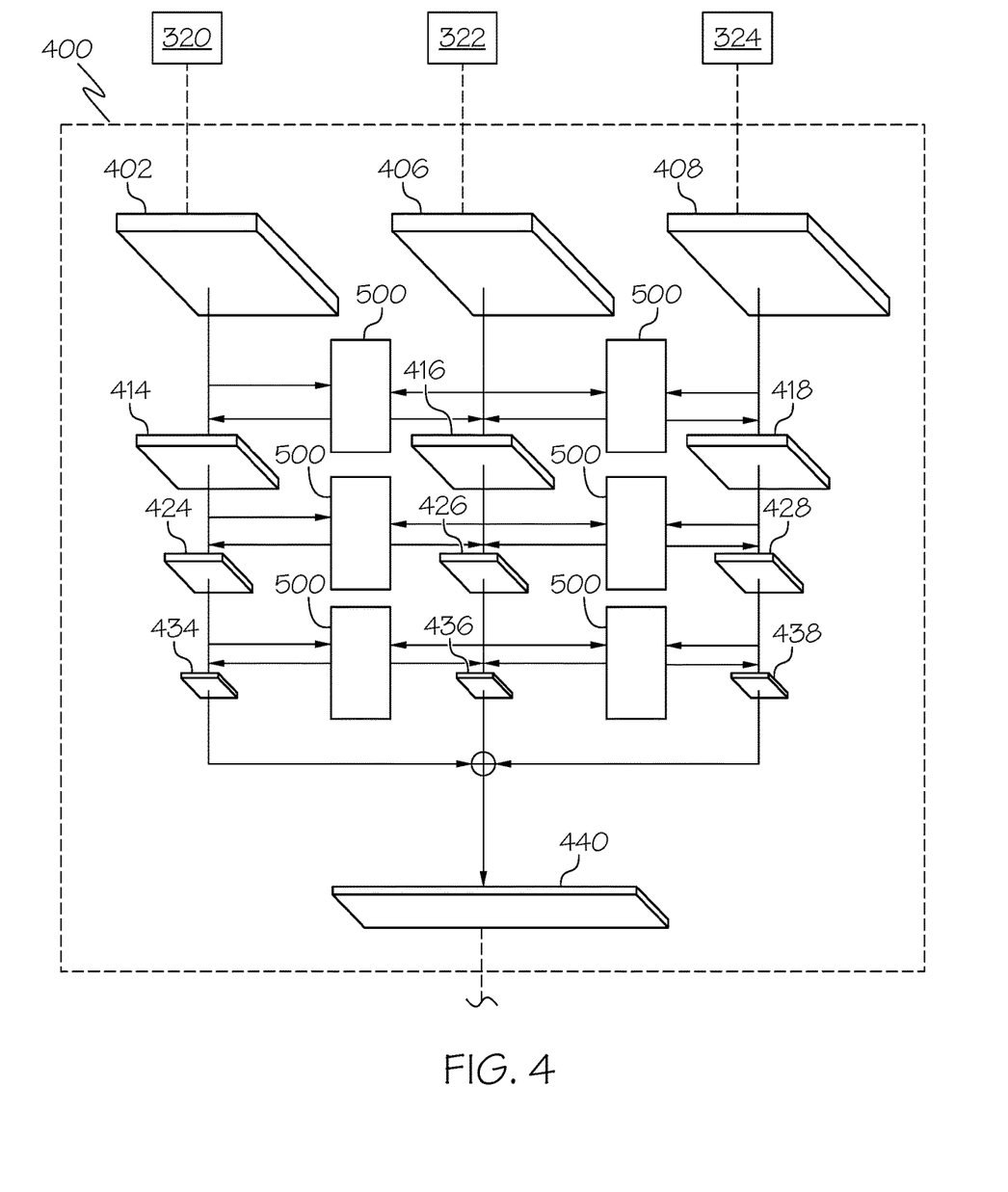
FIG. 4 depicts an example attention and fusion block, according to one or more embodiments shown and described herein.

Referring now to FIG. 4, an example attention and fusion block 400 is depicted. The attention and fusion block 400 takes feature encodings from the encoding block 300 as input. The inputs are fused from multiple levels (e.g., low, middle, and high levels of the information hierarchy) with a spatial-temporal attention framework for multi-level predictions (e.g., less than 20 meters, less than 200 meters, greater than 200 meters).

The framework of the attention and fusion block 400 is a transformer-based multi-scale HSTA model. The HSTA model fuses the information from different levels, each containing different scales of the input information. The HSTA model leverages the existing basic transformer self-attention layer, which functions like a convolutional layer. The HSTA model, due to its transformer-based nature, incorporates attention mechanisms without an RNN structure. The attention and fusion block 400 fuses together the data from each level into a single data structure that can be used by a decoder to generate predictions. The HSTA model of the attention and fusion block 400 may have several layers, where each layer is a convolutional layer that downsizes the features to different scales. The HSTA model, with the help of the attention model 500 (described in the discussion of FIG. 5), generates embeddings at each convolutional layer that contain information about parts of the inputs that are relevant to each other. Each convolutional layer passes its embedding to the next convolutional layer as inputs. The attention and fusion block 400 extracts the most important spatial-temporal information from different levels of information embeddings and fuses them together for creating a fused information embedding 440 that may be decoded to generate multi-level predictions and/or optimizations.

Figure 5:
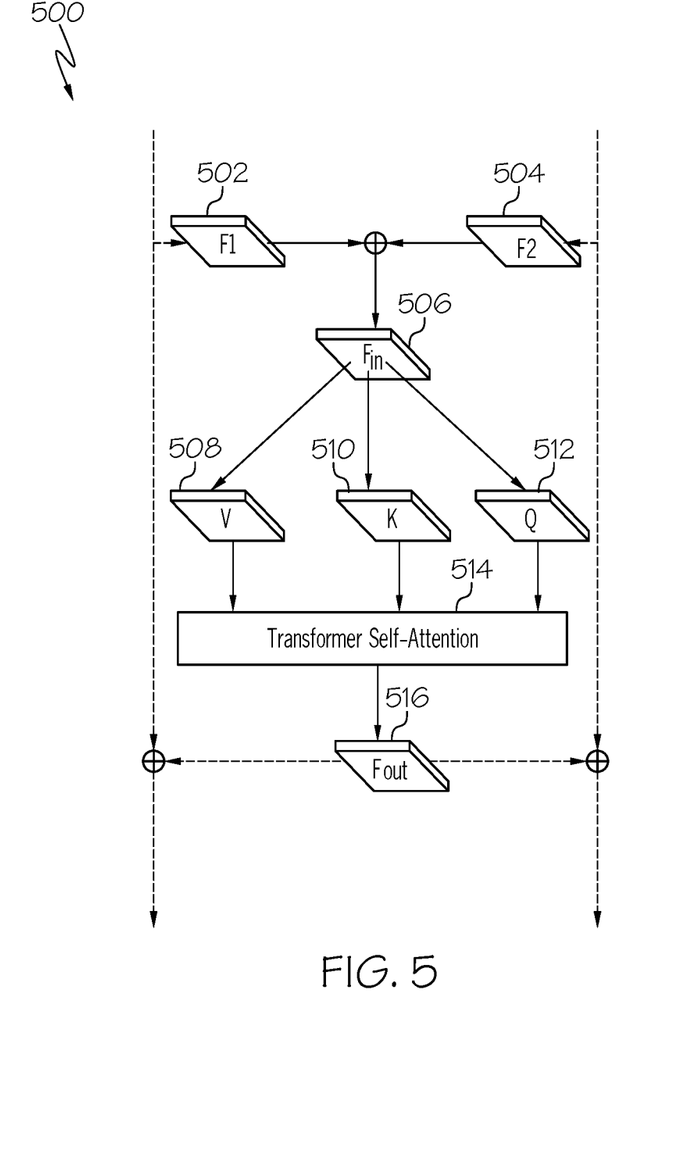
FIG. 5 depicts an example attention model, according to one or more embodiments shown and described herein.
Figure 6:
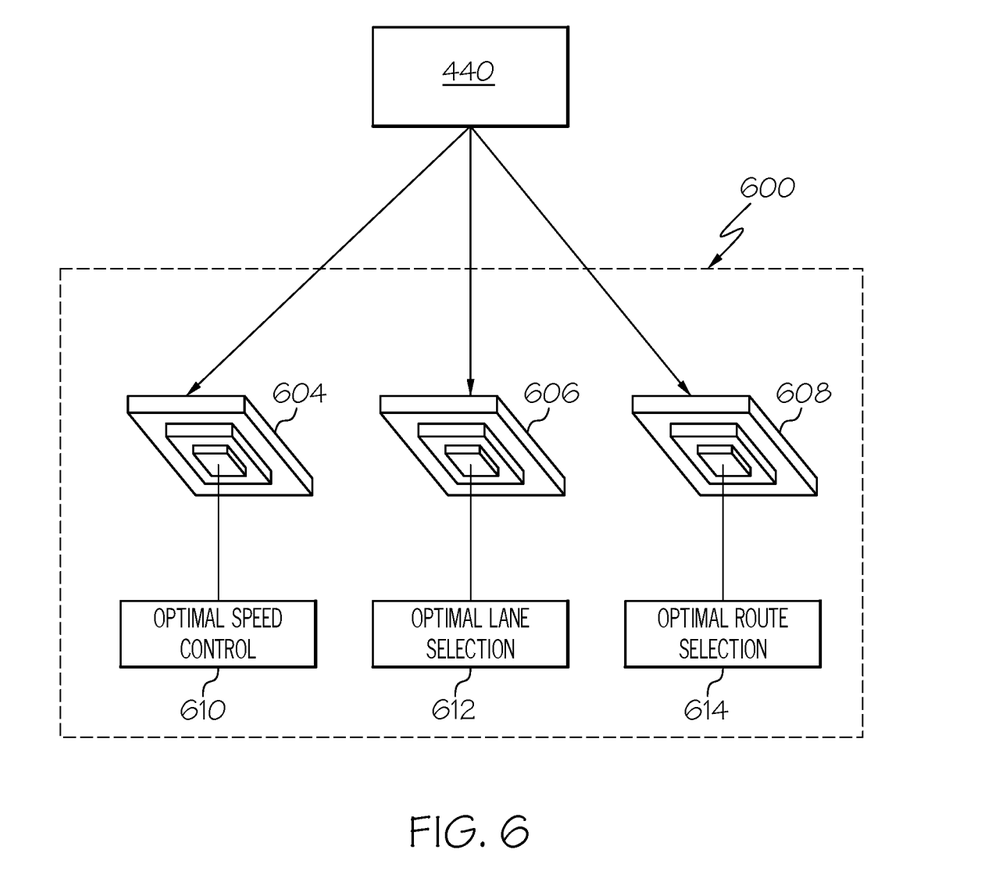
FIG. 6 depicts an example decoding block, according to one or more embodiments shown and described herein.

Referring now to FIG. 5, an example attention model 500 is depicted. The attention model 500 is a spatial temporal attention model based on transformer self-attention layers. The features 502, 504 at each scale from two adjacent information channels (e.g., low level and middle level) are concatenated to form input features 506. The input features 506 are used to generate three input tensors: Q 512, K 510, V 508. The input tensors 512, 510, 508 are created according to an attention function. The input tensors 512, 510, 508 further go through a basic transformer self-attention operation 514 that generates an output information tensor 516 therefrom. The output information tensor 516 is the same size as the input features 506. The output information tensor 516 is concatenated again with each of the features 502, 504. Subsequently, concatenations of the output information tensor 516 and the features 502, 504 may be scaled by a convolutional layer and passed again as features 502, 504, respectively, of another attention model.

Returning to FIG. 4, the attention and fusion block 400 may receive 3D environment features 320, geometric features 322, and interaction pattern features 324 from encoding block 300 (collectively, the "input data"), wherein the environment features 320 corresponds to the low level, the geometric features 322 correspond to the middle level, and the interaction pattern features 324 correspond to the high level. The input data may pass through several convolutional layers to downsize each set of features in the input data to different scales. That is, each set of features in the input data may be broken down into a series of layers, wherein each layer gets progressively downsized. The number of layers may be a fixed, predetermined number. Each layer at each level of the input data may have a corresponding layer at an adjacent level. For example, 3D environment features 320 may pass through convolutional layers 402, 414, 424, 434, geometric features 322 (in the level adjacent to the 3D environment features 320) may pass through convolutional layers 406, 416, 426, 436, and interaction pattern features 324 may pas through convolutional layers 408, 418, 428, 438.

Between each convolutional layer, the scaled features in adjacent levels may be passed through an attention model 500. Information from two adjacent levels are fused together since these sets of information are much more related to each other, which makes the process more efficient and the resulting information more robust. In some embodiments, information may be fused from non-adjacent levels. In some embodiments, information may be fused with one or more levels, adjacent or non-adjacent.

For example, referring to FIG. 5, after being processed by convolutional layers 402, 406, the 3D environment features 320 and geometric features 322 (represented by features 502, 504) may be concatenated to form input features 506 and are then used to generate input tensors Q 512, K 510, V 508. The input tensors 512, 510, 508 further go through a basic transformer self-attention operation 514 that generates an output information tensor 516. The output information tensor 516 is the same size as the input features 506 and is concatenated again with the 3D environment features 320 and geometric features 322.

Returning to FIG. 4, the output of the attention model 500 is fed as input to the subsequent convolution layer. The process repeats for each layer and each pair of adjacent levels of data. The output of each final convolution layer 434, 436, 438 are concatenated to form the fused spatial-temporal information embedding 440.

Referring now to FIG. 6, an example decoding block 600 is depicted. With the fused spatial-temporal information embedding 440 from the attention and fusion block 400, the multi-level prediction decoding block 600 decodes the fused spatial-temporal information embedding 440 to predict the driving environment at the different levels based on the needs of the user. The user can leverage the data from a wide variety of sources to predict the driving environment at different levels simultaneously. For example, the user may need to determine an optimal speed control 610, an optimal lane control 612, and an optimal route selection 614, each of which would normally need to be separately processed by separate systems but can now be determined simultaneously in a unified information embedding (i.e., the fused spatial-temporal information embedding 440). For each determination, there is a dedicated CNN designed and trained with the corresponding ground truth data. For example, the decoding block 600 may have a vehicle level CNN 604 that may be trained to determine and/or predict an optimal speed. The decoding block 600 may also have a local level CNN 606 that may be trained to determine and/or predict an optimal lane selection. The decoding block 600 may further have a route level CNN 608 that may be trained to determine and/or predict an optimal route. It should be understood that the decoder is not limited to determiner an optimal speed control 610, an optimal lane control 612, and an optimal route selection 614.

Figure 7:
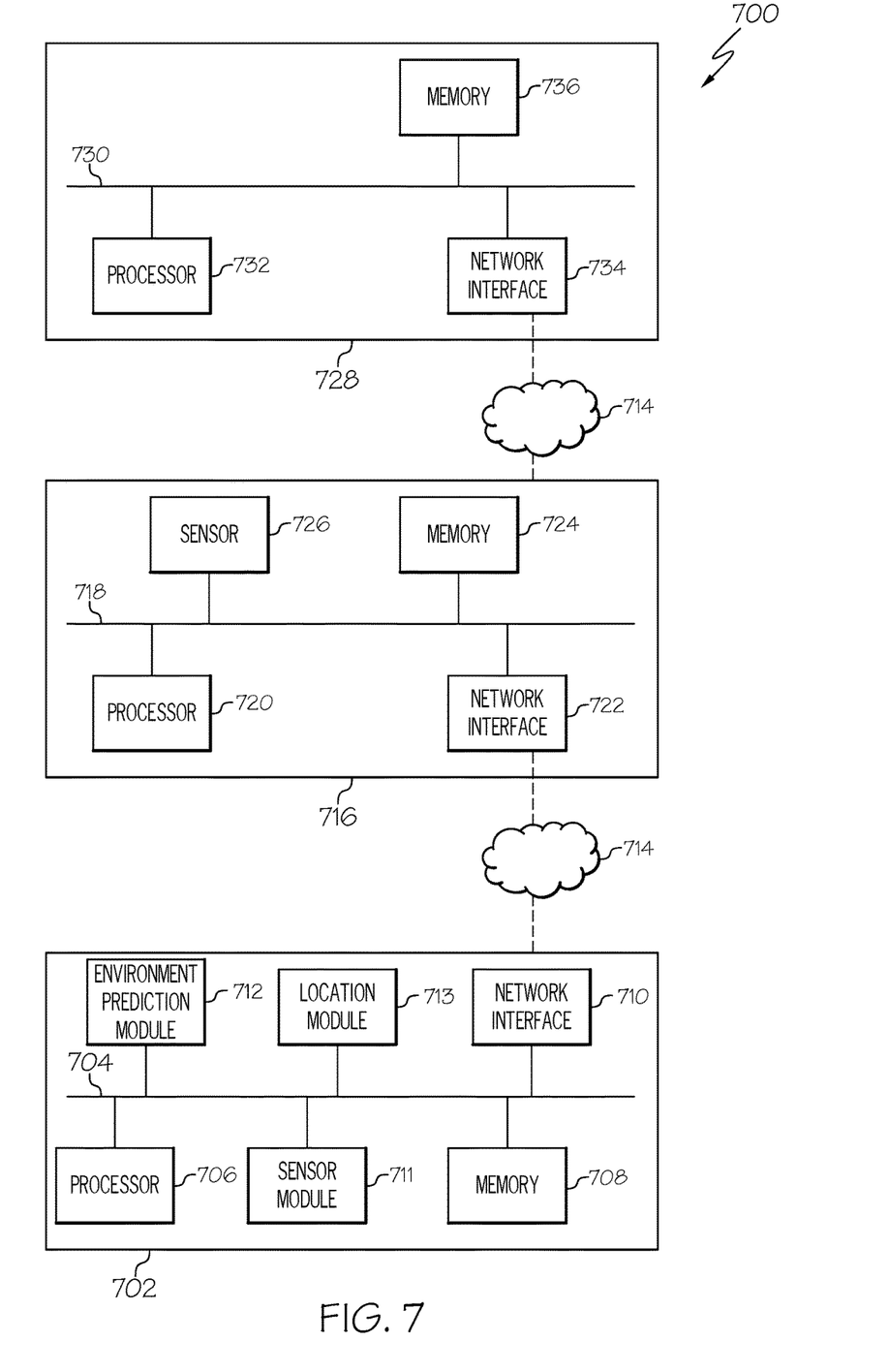
FIG. 7 depicts a schematic diagram of an example multi-scale driving environment prediction system, according to one or more embodiments shown and described herein.

Referring now to FIG. 7, a schematic diagram of an example multi-scale driving environment prediction system 700 is depicted. The system 700 comprises a connected vehicle 702 (i.e., the ego vehicle), a local source 716, and a cloud source 728 is schematically depicted. The connected vehicle 702 may be an automobile such as a terrestrial vehicle, an aquatic vehicle, an aerial vehicle, or any other passenger or non-passenger vehicle. In some embodiments, the vehicle is an autonomous vehicle that navigates its environment with limited or no human input. The connected vehicle 702 may include a processor 706, a memory module 708, a sensor module 711, an environment prediction module 712, a location module 713, and a network interface module 710. The connected vehicle 702 also may include a communication path 704 that communicatively connects the various components of the connected vehicle 702.

The processor 706 may include one or more processors that may be any device capable of executing machine-readable and executable instructions. Accordingly, each of the one or more processors of the processor 706 may be a controller, an integrated circuit, a microchip, or any other computing device. The processor 706 is coupled to the communication path 704 that provides signal connectivity between the various components of the connected vehicle 702. Accordingly, the communication path 704 may communicatively couple any number of processors of the processor 706 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 704 may be formed from any medium that is capable of transmitting a signal such as, e.g., conductive wires, conductive traces, optical waveguides, and the like. In some embodiments, the communication path 704 may facilitate the transmission of wireless signals, such as Wi-Fi, Bluetooth®, Near-Field Communication (NFC), and the like. Moreover, the communication path 704 may be formed from a combination of mediums capable of transmitting signals. In one embodiment, the communication path 704 comprises a combination of conductive traces, conductive wires, connectors, and buses that cooperate to permit the transmission of electrical data signals to components such as processors, memories, sensors, input devices, output devices, and communication devices. Accordingly, the communication path 704 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory module 708 is coupled to the communication path 704 and may contain one or more memory modules comprising RAM, ROM, flash memories, hard drives, or any device capable of storing machine-readable and executable instructions such that the machine-readable and executable instructions can be accessed by the processor 706. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory module 708. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The environment prediction module 712 is coupled to the communication path 704 and contains instructions for performing methods and systems described herein. For example, the environment prediction module 712 may contain machine learning logic in the form of machine-readable instructions for generating and processing system 100 and each of its constituent blocks (i.e., the data source block 200, encoding block 300, attention and fusion block 400, and decoding block 600). Machine learning logic may include representation learning, feature learning, CNNs, GNNs, attention models, image recognition, and the like. The environment prediction module 712 may also contain the machine-readable instructions for performing representation learning, feature learning, multi-level attention fusion, and other methods as described herein. In some embodiments, the environment prediction module 712 may be embodied in the memory module 708.

The connected vehicle 702 also comprises a network interface module 710 that includes network connectivity hardware for communicatively coupling the connected vehicle 702 to other network-attached devices, such as connected vehicles, connected infrastructure, and the like. The network interface module 710 can be communicatively coupled to the communication path 704 and can be any device capable of transmitting and/or receiving data via a network 714 or other communication mechanisms. Accordingly, the network interface module 710 can include a communication transceiver for sending and/or receiving any wired or wireless communication. For example, the network connectivity hardware of the network interface module 710 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices.

The connected vehicle 702 may connect with one or more other connected vehicles and/or external processing devices (e.g., a server) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

The sensor module 711 is coupled to the communication path 704 and communicatively coupled to the processor 706. The sensor module 711 may include, e.g., LIDAR sensors, RADAR sensors, optical sensors (e.g., cameras), laser sensors, proximity sensors, and the like. In embodiments, the sensor module 711 may monitor the surroundings of the connected vehicle 702 and may detect other vehicles, obstacles, traffic infrastructure, and/or the like.

A location module 713 is coupled to the communication path 704 such that the communication path 704 communicatively couples the location module 713 to other modules of the connected vehicle 702. The location module 713 may comprise one or more antennas configured to receive signals from global positioning system (GPS) satellites or any other satellite system. Specifically, in one embodiment, the location module 713 includes one or more conductive elements that interact with electromagnetic signals transmitted by GPS satellites. The received signal is transformed into a data signal indicative of the location (e.g., latitude and longitude) of the location module 713, and consequently, the connected vehicle 702.

The local source 716 may generally include components such as a processor 720, a memory module 724, a network interface module 722, a sensor module 726, and a communication path 718. Each component of the local source 716 is similar in structure and function to its counterpart of the connected vehicle 702, described in detail above and will not be repeated. The local source 716 may function to gather data at a local level. That is, the local source 716 may gather road data (e.g., traffic, obstacles, vehicle maneuvers, and other roadway information) at an intermediate distance from the connected vehicle 702, for example within 200 meters.

The local source 716 may be an edge server, a roadside unit (RSU), or the like. The local source 716 may be communicatively coupled to one or more connected vehicles, such as connected vehicle 702, via a network 714. The network 714 may be a wide area network, a local area network, a personal area network, a cellular network, a satellite network, and the like.

The cloud source 728 may generally include components such as a processor 732, a memory module 736, a network interface module 734, and a communication path 730. Each component of the cloud source 728 is similar in structure and function to its counterpart of the connected vehicle 702 and the local source 716, described in detail above and will not be repeated. The cloud source 728 may function to gather data at a distant level. That is, the cloud source 728 may gather route data (e.g., traffic, obstacles, vehicle maneuvers, and other roadway information) across any part of the whole route of the connected vehicle 702, including data at a distance greater than the coverage of the local source 716, for example greater than 200 meters.

The cloud source 728 may be an edge server, a roadside unit (RSU), or the like. The cloud source 728 may be communicatively coupled to one or more connected vehicles and/or local sources, such as connected vehicle 702 and/or local source 716, via one or more networks, such as network 714.

Figure 8:
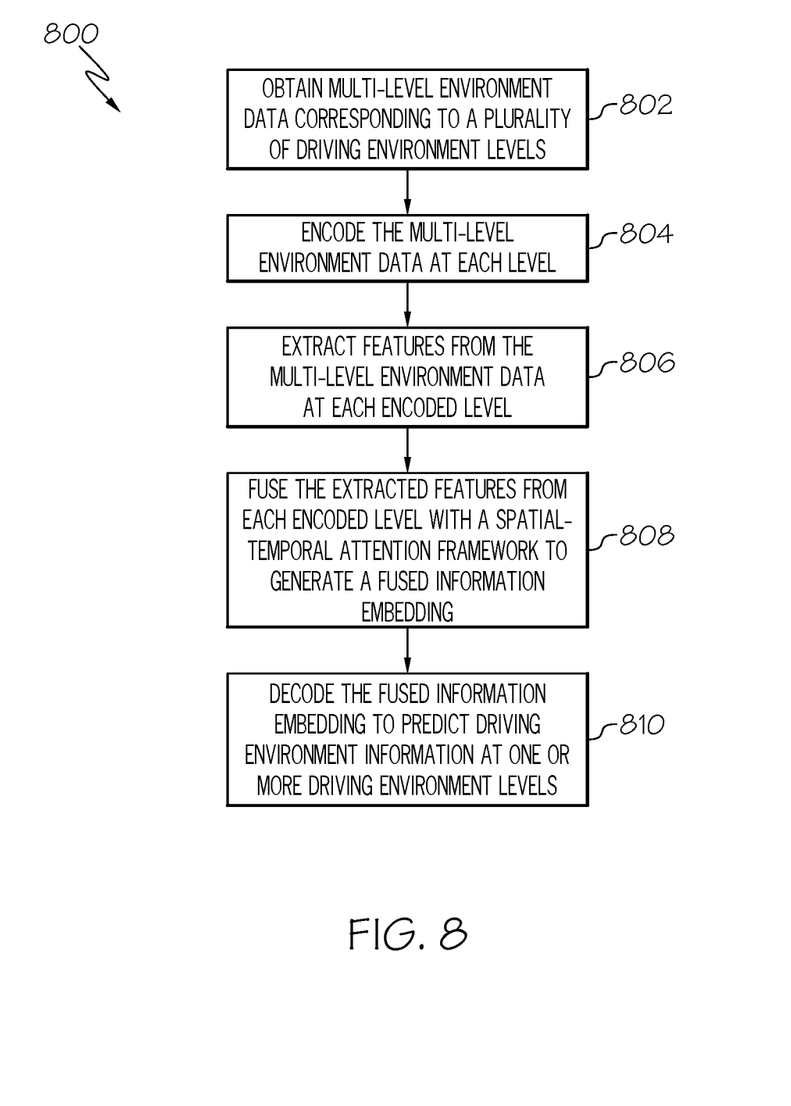
FIG. 8 depicts an example method for multi-scale driving environment prediction, according to one or more embodiments shown and described herein.

Referring now to FIG. 8, an example method 800 for multi-scale driving environment prediction is depicted. The method is described with reference to FIGS. 1, 3, and 7. In step 802, the connected vehicle 702 obtains multi-level environment data corresponding to a plurality of driving environment levels. The plurality of driving environment levels may include the levels included in data source block 200. For example, driving environment levels may include a vehicle level, a local level, and a route level. However, it should be understood that embodiments may have greater or fewer than the levels of embodiments described herein. The multi-level environment data may correspond to the plurality of driving environment levels as included in data source block 200. For example, multi-level environment data may include vehicle level data 208 corresponding to the vehicle level, local level data 210 corresponding to the local level, and route level data 212 corresponding to the route level.

In step 804, the connected vehicle 702 encodes the multi-level environment data at each driving environment level. The encoding block 300 receives data from each level of the driving environment (e.g., vehicle, local, and route levels) and first performs representation learning to generate a representation for each level data set. With representation learning 310, the input data may be encoded into a particular representation. For example, low-level input data may be encoded into a different representation than high-level input data. The representation chosen for a set of input data may make it easier to process for feature extraction (i.e., feature learning 318). Each level of information is encoded into different representations. At the bottom of the data hierarchy, the vehicle level data 208 may be encoded as an OGM 312. The OGM 312 shows drivable areas and non-drivable areas of the immediate surrounding area of the ego vehicle. At the middle of the data hierarchy, the local level data 210 may be encoded as a dynamic map representation 314. The dynamic map representation 314 may include the dynamic locations of detected vehicles and may be shown on a high definition map. At the top of the data hierarchy, route level data 212 may be encoded as a graph representation 316. The graph representation 316 can represent the traffic information at the lane level as well as the road network level.

In step 806, the connected vehicle 702 extracts features from the multi-level environment data at each encoded environment level. With feature learning 318, the encoded representations of the input data may each be reduced to a set of features. The features are such that they contain the most relevant information from the encoded representations of the input data. Reducing the data to features improves the efficiency of processing by reducing the amount of data needed to be processed and focusing on the more essential pieces of data which still being able to accurately describe the actual data set. The OGM 312 representation may be fed as input to a CNN-based feature learning model to extract the basic features of the immediate environment of the ego vehicle. For example, the CNN-based feature learning model may extract 3D environment features 320 from the OGM 312, such as vehicles, pedestrians, lane markings, and other environmental features. The dynamic map representation 314 may be fed as input to a CNN-based feature extractor for learning geometric features 322 including the road geometry information as well as the location information of each detected object on the road. The route level data 212 may be fed as input to a GNN to learn and extract the interaction pattern features 324, such as vehicle interaction information.

In step 808, the connected vehicle 702 fuses the extracted features from each encoded level with a spatial-temporal attention framework to generate a fused information embedding 440. The attention and fusion block 400 takes feature encodings from the encoding block 300 as input. The inputs are fused from multiple levels (e.g., low, middle, and high levels of the information hierarchy) with a spatial-temporal attention framework for multi-level predictions. The framework of the attention and fusion block 400 is a transformer-based multi-scale HSTA model. The attention and fusion block 400 encodes together the data from each level into a single data structure that can be used by a decoder to generate predictions. The HSTA model of the attention and fusion block 400 may have several layers, where each layer is a convolutional layer that downsizes the features to different scales. The HSTA model, with the help of the attention model 500, generates embeddings at each convolutional layer that contain information about parts of the inputs that are relevant to each other. Each convolutional layer passes its embedding to the next convolutional layer as inputs. The attention and fusion block 400 extracts the most important spatial-temporal information from different levels of information embeddings and fuses them together for creating a fused information embedding 440 that may be decoded to generate multi-level predictions and/or optimizations.

In step 810, the connected vehicle 702 decodes the fused information embedding 440 to predict driving environment information at one or more driving environment levels. With the fused spatial-temporal information embedding 440 from the attention and fusion block 400, the multi-level prediction decoding block 600 decodes the fused spatial-temporal information embedding 440 to predict the driving environment at the different levels based on the needs of the user. The user can leverage the data from a wide variety of sources to predict the driving environment at different levels simultaneously. For each type of prediction, there is a dedicated CNN designed and trained with the corresponding ground truth data.

For example, assume the connected vehicle 702 utilizes method 800 to optimize its driving for the most ecologically friendly outcome (e.g., highest energy efficiency). The connected vehicle 702 could utilize the fused spatial-temporal information embedding 440 to predict the driving environment information at each level so that it can optimize its driving policy at each level all at the same time through a single fused data structure rather than engaging in multiple isolated processes that cannot gain insight from data at different layers. At the vehicle level, the connected vehicle 702 may be able to determine the most efficient speed control. The vehicle level data 208 gathered by the connected vehicle 702 may be made more robust with the fusion of at least local level data 210 at block 400. For example, the system 100 may decide that the connected vehicle 702 should drive at a faster speed based on an anticipated lane change down the road. Without the knowledge of the lane change, the system 100 may not be able to identify the most efficient speed for the route of the connected vehicle 702. At the local level, the connected vehicle 702 may be able to determine the optimal lane selection for energy-efficient driving. The local level data 210 gathered by the local sensors 204 may be made more robust with the fusion of at least vehicle level data 208 and/or route level data 212 at block 400. At the route level, the connected vehicle 702 may be able to determine the optimal route. The route level data 212 may be made more robust with the fusion of at least local level data 210 at block 400.

It should now be understood that the embodiments disclosed herein include methods and systems for multi-scale driving environment prediction. Embodiments of the present disclosure are directed to a deep-learning-based holistic framework for fusing driving environment information from different sources at different scales. Fusing may be performed with a spatiotemporal attention mechanism so that the right information from different scales can be collectively understood and extracted for predicting the driving environment at different levels (e.g., trajectory level, lane level, road level, and route level) simultaneously. Embodiments include four blocks: a data source block, an encoding block, an attention and fusion block, and a decoding block.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method comprising:
   obtaining multi-level environment data corresponding to a plurality of driving environment levels;
   encoding the multi-level environment data at each level;
   extracting features from the multi-level environment data at each encoded level;
   fusing the extracted features from each encoded level with a spatial-temporal attention framework to generate a fused information embedding; and
   decoding the fused information embedding to predict driving environment information at one or more driving environment levels.

2. The method of claim 1, wherein the multi-level environment data includes vehicle level data, local level data higher than the vehicle level data, and route level data higher than the local level data.

3. The method of claim 2, wherein encoding the multi-level environment data at each level comprises one or more of:
   encoding the vehicle level data to an occupancy grid representation;
   encoding the local level data to a dynamic map representation; and
   encoding the route level data to a graph representation.

4. The method of claim 2, wherein extracting features from the multi-level environment data at each encoded level comprises one or more of:
   extracting 3D environment features from an encoding of the vehicle level data;
   extracting geometric features from an encoding of the local level data; and
   extracting pattern features from an encoding of the route level data.

5. The method of claim 2, wherein:
   the vehicle level data is obtained from vehicle sensors of vehicles;
   the local level data is obtained from sensors of roadside units; and
   the route level data is obtained from a cloud server.

6. The method of claim 2, wherein:
   the vehicle level data is obtained with first latency;
   the local level data is obtained with second latency longer than the first latency; and
   the route level data is obtained with third latency longer than the second latency.

7. The method of claim 1, wherein the spatial-temporal attention framework comprises:
   concatenating the features from a pair of levels of the encoded multi-level environment data;
   generating a plurality of input tensors based on the concatenated features; and
   performing a transformer self-attention operation on the plurality of input tensors to generate an output information tensor.

8. The method of claim 1, wherein decoding the fused information embedding to predict driving environment information at one or more driving environment levels comprises:
   generating an optimal speed control;
   generating an optimal lane selection; and
   generating an optimal route selection.

9. The method of claim 1, wherein extracting features from the multi-level environment data at each encoded level comprises extracting features from each encoded level at a plurality of scales of each encoded level.

10. A system comprising:
    a controller programmed to perform operations comprising:
       obtaining multi-level environment data corresponding to a plurality of driving environment levels;
       encoding the multi-level environment data at each level;
       extracting features from the multi-level environment data at each encoded level;
       fusing the extracted features from each encoded level with a spatial-temporal attention framework to generate a fused information embedding; and
       decoding the fused information embedding to predict driving environment information at one or more driving environment levels.

11. The system of claim 10, wherein the multi-level environment data includes vehicle level data, local level data higher than the vehicle level data, and route level data higher than the local level data.

12. The system of claim 11, wherein encoding the multi-level environment data at each level comprises one or more of:
    encoding the vehicle level data to an occupancy grid representation;
    encoding the local level data to a dynamic map representation; and
    encoding the route level data to a graph representation.

13. The system of claim 11, wherein extracting features from the multi-level environment data at each encoded level comprises one or more of:
    extracting 3D environment features from an encoding of the vehicle level data;

extracting geometric features from an encoding of the local level data; and extracting pattern features from an encoding of the route level data.

14. The system of claim 11, wherein:

the vehicle level data is obtained from vehicle sensors of vehicles;

the local level data is obtained from sensors of roadside units; and the route level data is obtained from a cloud server.

15. The system of claim 11, wherein:

the vehicle level data is obtained with first latency;

the local level data is obtained with second latency longer than the first latency; and the route level data is obtained with third latency longer than the second latency.

16. The system of claim 10, wherein the spatial-temporal attention framework comprises:

concatenating the features from a pair of levels of the encoded multi-level environment data;

generating a plurality of input tensors based on the concatenated features; and performing a transformer self-attention operation on the plurality of input tensors to generate an output information tensor.

17. The system of claim 10, wherein decoding the fused information embedding to predict driving environment information at one or more driving environment levels comprises:

generating an optimal speed control;

generating an optimal lane selection; and generating an optimal route selection.

18. The system of claim 10, wherein extracting features from the multi-level environment data at each encoded level comprises extracting features from each encoded level at a plurality of scales of each encoded level.

19. A non-transitory medium having machine-readable instructions that cause a processor to perform operations comprising:

obtaining multi-level environment data corresponding to a plurality of driving environment levels;

encoding the multi-level environment data at each level;

extracting features from the multi-level environment data at each encoded level;

fusing the extracted features from each encoded level with a spatial-temporal attention framework to generate a fused information embedding; and decoding the fused information embedding to predict driving environment information at one or more driving environment levels.

20. The non-transitory medium of claim 19, wherein the multi-level environment data includes vehicle level data, local level data higher than the vehicle level data, and route level data higher than the local level data.

* * * * *